United States Patent
Qi et al.

(10) Patent No.: US 12,263,606 B2
(45) Date of Patent: Apr. 1, 2025

(54) BATTERY, POWER UTILIZATION DEVICE, WELDING DEVIATION DETECTION DEVICE AND WELDING DEVIATION DETECTION METHOD

(71) Applicant: JIANGSU CONTEMPORARY AMPEREX TECHNOLOGY LIMITED, Changzhou (CN)

(72) Inventors: Congcheng Qi, Changzhou (CN); Jian Li, Changzhou (CN); Shuping Qu, Changzhou (CN); Xu Zhang, Changzhou (CN); Pengfei Li, Changzhou (CN); Yingjun Li, Changzhou (CN); Shixiong Zheng, Changzhou (CN)

(73) Assignee: JIANGSU CONTEMPORARY AMPEREX TECHNOLOGY LIMITED, Changzhou (CN)

( * ) Notice: Subject to any disclaimer, the term of this patent is extended or adjusted under 35 U.S.C. 154(b) by 17 days.

(21) Appl. No.: 18/337,063

(22) Filed: Jun. 19, 2023

(65) Prior Publication Data
US 2023/0330860 A1    Oct. 19, 2023

Related U.S. Application Data

(63) Continuation of application No. PCT/CN2022/074697, filed on Jan. 28, 2022.

(30) Foreign Application Priority Data

Nov. 16, 2021  (CN) .......................... 202111358262.1

(51) Int. Cl.
B23K 31/00    (2006.01)
B23K 31/12    (2006.01)
(Continued)

(52) U.S. Cl.
CPC ........... B25J 9/1697 (2013.01); B23K 31/125 (2013.01); B25J 9/1687 (2013.01); B25J 11/005 (2013.01)

(58) Field of Classification Search
CPC ...... B25J 9/1697; B25J 9/1687; B25J 11/005; H01M 50/516; B23K 31/125; Y02E 60/10; G01B 11/00
(Continued)

(56) References Cited

U.S. PATENT DOCUMENTS 9,853,333 B2 * 12/2017 Ramsayer ............. H01M 50/55
2020/0343522 A1 * 10/2020 Zheng ................. H01M 50/557
(Continued)

FOREIGN PATENT DOCUMENTS

CN    205723741 U    11/2016
CN    205950119 U    2/2017
(Continued)

OTHER PUBLICATIONS

The First Office Action received in the corresponding Chinese Application 202111358262.1, mailed Dec. 22, 2021.
(Continued)

Primary Examiner — Kiley S Stoner
(74) Attorney, Agent, or Firm — Kilpatrick Townsend & Stockton LLP

(57) ABSTRACT

A welding deviation detection device includes a pre-welding addressing mechanism that can determine relative position relations between location holes and poles in a battery, and send the relative position relations to a welding mechanism and a post-welding detection mechanism; the welding mechanism can detect first positions of the location holes, and determine first positions of the plurality of poles based on the first positions of the location holes and the relative position relation, so that the welding mechanism can accu-
(Continued)

Determine relative position relations between location holes and a plurality of poles in a battery, and send the relative position relation to a welding mechanism and a post-welding detection mechanism by a pre-welding addressing mechanism — S1

Detect first positions of the location holes, determine first positions of the plurality of poles based on the first positions of the location holes and the received relative position relations, and weld a bus assembly to the plurality of poles based on the first positions of the plurality of poles to form a plurality of welds by the welding mechanism — S2

Detect second positions of the location holes and positions of the plurality of welds, and detect welding deviation situations of the bus assembly and the poles based on the second positions of the location holes, the positions of the plurality of welds and the received relative position relations by the post-welding detection mechanism — S3 rately weld a bus assembly to the plurality of poles based on the first positions of the plurality of poles to form a plurality of welds; and a post-welding detection mechanism that can detect second positions of the location holes and positions of the welds, and detect welding deviation situations of the bus assembly and the poles based on the second positions of the location holes.

10 Claims, 4 Drawing Sheets

(51) Int. Cl.
  *B25J 9/16* (2006.01)
  *B25J 11/00* (2006.01)
(58) Field of Classification Search
  USPC .................................... 228/8–12, 102–105
  See application file for complete search history.

(56) References Cited

U.S. PATENT DOCUMENTS

| | | | |
|---|---|---|---|
| 2021/0252638 A1 | 8/2021 | Roh et al. | |
| 2022/0360064 A1* | 11/2022 | Babinot | H02G 5/005 |
| 2024/0072321 A1* | 2/2024 | Li | H01M 50/502 |
| 2024/0123548 A1 | 4/2024 | Roh et al. | |
| 2024/0165736 A1* | 5/2024 | Cheong | H01M 50/169 |
| 2024/0322383 A1* | 9/2024 | Chen | H01M 50/505 |

FOREIGN PATENT DOCUMENTS

| | | | | | |
|---|---|---|---|---|---|
| CN | 106784563 | A | | 5/2017 | |
| CN | 107717273 | A | | 2/2018 | |
| CN | 207183342 | U | | 4/2018 | |
| CN | 207431612 | U | | 6/2018 | |
| CN | 108539243 | A | | 9/2018 | |
| CN | 208256816 | U | | 12/2018 | |
| CN | 109332894 | A | | 2/2019 | |
| CN | 109961479 | A | * | 7/2019 | ............. G06T 7/73 |
| CN | 109579718 | A | | 10/2019 | |
| CN | 110328461 | A | | 10/2019 | |
| CN | 110653525 | A | | 1/2020 | |
| CN | 210837974 | U | | 6/2020 | |
| CN | 111398296 | A | * | 7/2020 | |
| CN | 210981162 | U | | 7/2020 | |
| CN | 111856142 | A | | 10/2020 | |
| CN | 113063824 | A | | 7/2021 | |
| CN | 214503840 | U | | 10/2021 | |
| CN | 113790673 | A | * | 12/2021 | ............ B25J 11/005 |
| EP | 3868509 | A1 | | 8/2021 | |
| JP | 2019179653 | A | | 10/2019 | |

OTHER PUBLICATIONS

The Notice of Allowance received in the corresponding Chinese Application 202111358262.1, mailed Jan. 12, 2022.
International Search Report received in the corresponding International Application PCT/CN2022/074697, mailed Aug. 18, 2022.
Written Opinion received in the corresponding International Application PCT/CN2022/074697, mailed Aug. 18, 2022.
Zhang, Wanliang, et al. "A Study on the Relationship between Temperature Distribution of Lithium Battery Busbar and Current-Carrying Capacity", 5 pages.
Shen, Xupei ,et al. "Lightweight design of power valve-regulated lead-acid battery", 2 pages.
The extended European search report received in the counterpart European application 22894099.5, mailed on Aug. 20, 2024.

* cited by examiner

BATTERY, POWER UTILIZATION DEVICE, WELDING DEVIATION DETECTION DEVICE AND WELDING DEVIATION DETECTION METHOD

The present application is a continuation of International Application PCT/CN2022/074697, filed Jan. 28, 2022, which claims the priority to Chinese Patent Application No. 202111358262.1, filed to the Chinese Patent Office on Nov. 16, 2021, and entitled "battery, power utilization device, welding deviation detection device and welding deviation detection method", which is incorporated in its entirety herein by reference.

TECHNICAL FIELD

Embodiments of the present application relate to the technical field of battery manufacturing, and particularly relate to a battery, a power utilization device, a welding deviation detection device and a welding deviation detection method.

BACKGROUND

In the production process of power batteries, a plurality of poles of a plurality of battery cells and a bus assembly in a battery need to be welded together to achieve the electrical connection of the plurality of battery cells. If welding deviations of the bus assembly and the poles occur, the safety performance of the battery will be affected. In related arts, there are many studies on how to improve the accuracy of welding positions, but there are few studies on welding quality detection. Therefore, a welding deviation detection device is urgently needed to detect welding deviation situations of the bus assembly and the poles, so as to achieve welding quality monitoring.

SUMMARY

In view of the above problems, embodiments of the present application provide a battery, a power utilization device, a welding deviation detection device and a welding deviation detection method; and according to the embodiments of the present application, a bus assembly and a plurality of poles can be welded accurately through a welding mechanism, and welding deviation situations can be detected simply, conveniently and timely through a post-welding detection mechanism.

According to a first aspect of the embodiments of the present application, a welding deviation detection device is provided. The welding deviation detection device includes a pre-welding addressing mechanism, a welding mechanism and a post-welding detection mechanism. The pre-welding addressing mechanism is configured to determine relative position relations between location holes and a plurality of poles in a battery, and to send the relative position relations to a welding mechanism and a post-welding detection mechanism, where the location holes are disposed on end plates of the battery along a first direction. The welding mechanism is configured to detect first positions of the location holes, to determine first positions of the plurality of poles based on the first positions of the location holes and the received relative position relations, and to weld a bus assembly to the plurality of poles based on the first positions of the plurality of poles to form a plurality of welds. The post-welding detection mechanism is configured to detect second positions of the location holes and positions of the plurality of welds, and to detect welding deviation situations of the bus assembly and the poles based on the second positions of the location holes, the positions of the plurality of welds and the received relative position relations.

Through the above-mentioned solution, the pre-welding addressing mechanism can determine the relative position relations between the location holes and the plurality of poles in the battery, and send the relative position relations to the welding mechanism and the post-welding detection mechanism. The welding mechanism can detect the first positions of the location holes, and determine the first positions of the plurality of poles based on the first positions of the location holes and the received relative position relations, so the welding mechanism can accurately weld the bus assembly to the plurality of poles based on the first positions of the plurality of poles to form a plurality of welds. The post-welding detection mechanism can detect the second positions of the location holes and positions of the plurality of welds, and detect welding deviation situations of the bus assembly and the plurality of poles based on the second positions of the location holes, the positions of the plurality of welds and the received relative position relations. According to the embodiments of the present application, the bus assembly and the plurality of poles can be welded accurately through the welding mechanism, and the welding deviation situations can be detected simply, conveniently and timely through the post-welding detection mechanism.

In some embodiments, the pre-welding addressing mechanism includes a first visual photographing device configured to detect the positions of the location holes and the positions of the plurality of poles, to determine the relative position relations based on the positions of the location holes and the positions of the plurality of poles, and to send the relative position relations to the welding mechanism and the post-welding detection mechanism.

Through the above-mentioned solution, the accurate determination of the position of each pole by the welding mechanism and the post-welding detection mechanism may be facilitated.

In some embodiments, the welding mechanism includes a second visual photographing device and a welding device. The second visual photographing device is configured to detect the first positions of the location holes and receive the relative position relations, to determine the first positions of the plurality of poles based on the first positions of the location holes and the relative position relations, and to send the first positions of the plurality of poles to the welding device. The welding device is configured to receive the first positions of the plurality of poles, and to weld the bus assembly to the plurality of poles based on the first positions of the plurality of poles.

Through the above-mentioned solution, the second visual photographing device can accurately determine the first positions of the plurality of poles in the welding mechanism, and the welding device can accurately weld the bus assembly to the plurality of poles based on the first positions of the poles sent by the second visual photographing device, so that the welding accuracy is improved.

In some embodiments, the post-welding detection mechanism includes a third visual photographing device configured to detect the second positions of the location holes and the positions of the plurality of welds, to receive the relative position relations, to determine second positions of the plurality of poles based on the second positions of the location holes and the relative position relations, and to detect welding deviation situations of the bus assembly and the poles based on the second positions of the plurality of poles and the positions of the plurality of welds.

Through the above-mentioned solution, the third visual photographing device can accurately determine the second positions of the plurality of poles in the post-welding mechanism, and can detect the welding deviation situations of the bus assembly and the poles based on the detected positions of the plurality of welds and the second positions of the plurality of poles, so as to achieve good welding quality monitoring.

In some embodiments, the post-welding detection mechanism may further include an electronic measuring instrument configured to detect fitting gaps between the poles and the bus assembly.

Through the above-mentioned solution, the welding quality of each pole and the bus assembly can be evaluated based on the fitting gap, so as to achieve good welding quality monitoring.

According to a second aspect of the embodiments of the present application, there is provided a welding deviation detection method which can be applied to the welding deviation detection device in the first aspect. The welding deviation detection method includes: determining relative position relations between location holes and a plurality of poles in a battery, and sending the relative position relations to a welding mechanism and a post-welding detection mechanism by a pre-welding addressing mechanism; detecting first positions of the location holes, determining first positions of the plurality of poles based on the first positions of the location holes and the received relative position relations, and welding a bus assembly to the plurality of poles based on the first positions of the plurality of poles to form a plurality of welds by the welding mechanism; and detecting second positions of the location holes and positions of the plurality of welds, and detecting welding deviation situations of the bus assembly and the poles based on the second positions of the location holes, the positions of the plurality of welds and the received relative position relations by the post-welding detection mechanism.

In some embodiments, the welding deviation detection method may include: detecting the positions of the location holes and the positions of the plurality of poles, determining the relative position relations based on the positions of the location holes and the positions of the plurality of poles, and sending the relative position relations to the welding mechanism and the post-welding detection mechanism by a first visual photographing device.

In some embodiments, the welding deviation detection method may include: detecting the first positions of the location holes, receiving the relative position relations, determining the first positions of the plurality of poles based on the first positions of the location holes and the relative position relations, and sending the first positions of the plurality of poles to a welding device by a second visual photographing device; and receiving the first positions of the plurality of poles, and welding the bus assembly to the plurality of poles based on the first positions of the plurality of poles by the welding device.

In some embodiments, the welding deviation detection method may include: detecting the second positions of the location holes and the positions of the plurality of welds, receiving the relative position relations, determining second positions of the plurality of poles based on the second positions of the location holes and the relative position relations, and detecting welding deviation situations of the bus assembly and the poles based on the second positions of the plurality of poles and the positions of the plurality of welds by a third visual photographing device.

In some embodiments, the welding deviation detection method may include: detecting fitting gaps between the poles and the bus assembly by an electronic measuring instrument.

According to a third aspect of the embodiments of the present application, there is provided a battery including end plates and a bus assembly. Location holes are provided on the end plates along a first direction, and configured to localize poles of a plurality of battery cells. The bus assembly is welded to the poles based on the localization of the location holes, and configured to electrically connect the plurality of battery cells.

Because the location holes are provided on the end plates, even if the bus assembly covers the plurality of poles, the plurality of poles can be accurately localized via the location holes, so that a location reference can be provided for the welding of a busbar and the poles, which facilitates the accurate welding of the bus assembly and the poles. The location holes can also provide a position reference for the detection of welding deviation situations of the bus assembly and the poles subsequent.

In some embodiments, the number of the location hole is two, the two location holes are distributed in a staggered manner along a second direction and a third direction, and the second direction and the third direction are perpendicular to the first direction.

Through the above-mentioned solution, the two location holes can localize the poles from different orientations, which improves the accuracy of location of the poles.

In some embodiments, portions of the bus assembly corresponding to the poles are provided with detection holes configured to allow detection of the fitting gaps between the poles and the bus assembly, and an aperture of the detection hole is 1.5 mm-2 mm.

Through the above-mentioned solution, it is convenient for a detector to detect the fitting gaps between the poles and the bus assembly through the detection hole. The aperture of the detection hole is set to be 1.5 mm-2 mm, which not only can meet the detection requirements of the detector, but also will not affect the welding quality due to a too large aperture of the detection hole.

According to a fourth aspect of the embodiments of the present application, there is provided a power utilization device including the battery that is provided in the third aspect and configured to provide electrical energy for the power utilization device.

The above description is only an overview of the technical solutions of the embodiments of the present application. To understand the technical means of the embodiments of the present application more clearly, the embodiments can be implemented according to the contents of the Specification; and to make the above and other objectives, features and advantages of the embodiments of the present application more comprehensible, specific embodiments of the present application will be described below.

BRIEF DESCRIPTION OF THE DRAWINGS

To illustrate the technical solutions of the embodiments of the present application more clearly, the following briefly introduces the accompanying drawings required to be used in the description of the embodiments. Obviously, the accompanying drawings in the following description are some embodiments of the present application. For those of ordinary skill in the art, other accompanying drawings can also be obtained from these accompanying drawings without creative efforts.

FIG. 1 is a schematic structural diagram of a vehicle according to embodiments of the present application.

DESCRIPTION OF REFERENCE NUMERALS

Figure 1:
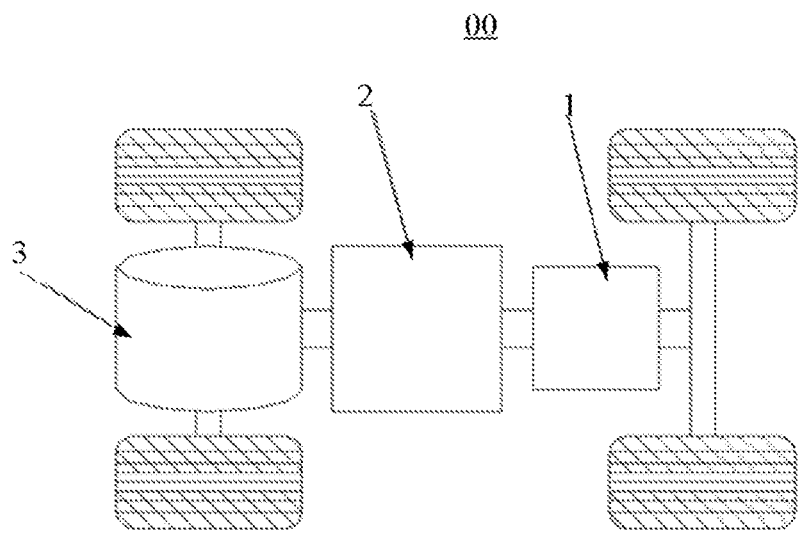

00—vehicle, 1—battery, 11—box, 11a—first box part, 11b—second box part, 11c—inner space, 12—battery cell, 121—end cap, 121a—pole, 122—case, 123—electrode assembly, 13—end plate, 131—location hole, 14—bus assembly, 141—detection hole, 2—controller, 3—motor, 4—pre-welding addressing mechanism, 41—first visual photographing device, 5—welding mechanism, 51—second visual photographing device, 52—welding device, 6—post-welding detection mechanism, 61—third visual photographing device, 62—electronic measuring instrument, 7—assembly line, X—first direction, Y—second direction, Z—third direction.

DETAILED DESCRIPTION OF THE EMBODIMENTS

In order to make the objectives, technical solutions and advantages of the embodiments of the present application clearer, the technical solutions in the embodiments of the present application will be described clearly and completely below with reference to the accompanying diagrams in the embodiments of the present application. Apparently, the described embodiments are merely a part rather than all of the embodiments of the present application. Based on the embodiments in the present application, all other embodiments obtained by those of ordinary skill in the art without creative efforts shall fall within the scope of protection of the present application.

Unless otherwise defined, all technical and scientific terms used herein have the same meaning as commonly understood by those of ordinary skill in the technical field of the present application; and the terms used herein in the Specification of the present application are for the purpose of describing the specific embodiments only, and are not intended to limit the present application.

The terms "comprising" and "having" and any variations thereof in the Specification and Claims of the present application as well as the brief description of the drawings are intended to cover but not exclude other contents. The word "a" or "an" does not exclude the presence of a plurality.

Reference herein to "embodiment" means that particular features, structures, or characteristics described in connection with the embodiments may be included in at least one embodiment of the present application. The phrase "embodiment" appearing in various places in the Specification is not necessarily all referring to the same embodiment, nor is it a separate or alternative embodiment that is mutually exclusive with other embodiments. It is explicitly and implicitly understood by those skilled in the art that the embodiments described herein may be combined with other embodiments.

The term "and/or" herein is only an association relation to describe associated objects, indicating that there can be three kinds of relations, for example, A and/or B, which may mean that A exists alone, A and B exist simultaneously, and B exists alone. In addition, the character "/" herein generally indicates that fore-and-aft related objects are in an "or" relation.

Orientation words appearing in the following description are all directions shown in the figures, and not intended to limit the specific structures of the battery, the power utilization device and the welding deviation detection device of the present application. For example, in the description of the present application, the orientation or positional relations indicated by the terms "center", "longitudinal", "transverse", "length", "width", "thickness", "upper", "lower", "front", "rear", "left", "right", "vertical", "horizontal", "top", "bottom", "inner", "outer", "clockwise", "counter-clockwise", "axial", "radial", "circumferential", etc. are orientation or positional relations shown based on the accompanying drawings, only for convenience of describing the present application and simplifying the description, rather than indicating or implying that indicated device or element must have a particular orientation, and be constructed and operative in a particular orientation, and thus may not be construed as limitations to the present application.

In addition, the expressions of indication directions such as X direction, Y direction, and Z direction for explaining the operation and configuration of respective components of the battery, the power utilization device, and the welding deviation detection device of the present embodiment are not absolute but relative, and although these indications are appropriate when components of a battery pack are in the positions shown in the figures, when these positions are changed, the directions should be interpreted differently to correspond to the changes.

In addition, the terms "first", "second", etc. in the Specification and Claims of the present application or the above accompanying drawings are used to distinguish different objects, rather than to describe a specific order, and may expressly or implicitly include one or more of the features.

In the description of the present application, unless otherwise stated, the meaning of "a plurality of" refers to two or more (including two), and similarly, "a plurality of sets" refers to two or more sets (including two sets).

In the description of the present application, it will be appreciated that, unless otherwise expressly specified and limited, the terms "installation", "linkage" and "connection" should be understood in a broad sense, for example, the "linkage" or "connection" of mechanical structures may refer to a physical connection, for example, the physical connection may be a fixed connection, such as a fixed connection through fasteners, and a fixed connection through screws, bolts or other fasteners; the physical connection may also be a detachable connection, such as mutual fastening or snap-in connection; and the physical connection may further be an integral connection, such as a connection formed by welding, bonding or integral molding. The "linkage" or "connection" of circuit structures may refer not only to the physical connection, but also to an electrical connection or a signal connection, for example, it may be a direct connection, that is, the physical connection, or an indirect connection through at least one intermediate element as long as the circuit is connected, it may also be an internal connection of two elements; the signal connection may also refer to a signal connection implemented through a media medium, such as radio waves, in addition to a signal connection implemented through a circuit. For those of ordinary skill in the art, the specific meanings of the above terms in the present application can be understood according to specific circumstances.

In the production process of power batteries, a plurality of battery cells are often assembled into a battery pack, then a bus assembly is attached to poles of the plurality of battery cells in the battery pack, and the bus assembly and the poles are welded together according to a predetermined design to conduct a plurality of poles through the bus assembly, so as to electrically connect the plurality of battery cells.

In related arts, a battery pack is placed on a battery module welding localization device, so that the battery pack is localized at a welding position by the battery module welding localization device. Then, a cover plate covers a bus assembly of the battery pack at the welding position, so that end alignment of a pressing cylinder on the cover plate and poles is achieved, and a pressing force is exerted on the bus assembly through the pressing cylinder to press the bus assembly and the pole tightly. Then, the bus assembly and the poles are welded in the pressing cylinder.

Inventors found that the precise alignment of the pressing cylinder and the poles can be improved by the battery module welding locating device in related arts, so that the bus assembly and the poles are closely attached, thereby reducing the probability of occurrence of welding deviation and pseudo soldering when the bus assembly and the poles are welded. However, since the pressing cylinder on the cover plate and the poles cannot be well aligned due to factors such as manufacturing errors, assembly errors and the like of each workpiece in the battery module welding localization device, the localization accuracy is not high, and problems such as welding deviation and pseudo soldering and the like will also be caused. Thus, it can be seen that in related arts, the accuracy of welding positions can be improved only from the locating device, but the occurrence of welding deviation situations cannot be avoided, and the welding situations cannot be detected.

Based on this, the embodiments of the present application provide a welding deviation detection device including a pre-welding addressing mechanism, a welding mechanism and a post-welding detection mechanism. The pre-welding addressing mechanism can determine relative position relations between location holes and a plurality of poles in a battery, and send the relative position relations to the welding mechanism and the post-welding detection mechanism. The welding mechanism can detect first positions of the location holes, and determine first positions of the plurality of poles based on the first positions of the location holes and the received relative position relations, so that the welding mechanism can accurately weld a bus assembly to the plurality of poles based on the first positions of the plurality of poles to form a plurality of welds. The post-welding detection mechanism can detect second positions of the location holes and positions of the plurality of welds, and detect welding deviation situations of the bus assembly and the poles based on the second positions of the location holes, the positions of the plurality of welds and the received relative position relations. According to the embodiments of the present application, the bus assembly and the plurality of poles can be accurately welded through the welding mechanism, and welding deviation situations can be detected simply, conveniently and timely through the post-welding detection mechanism.

The welding deviation detection device described in the embodiments of the present application can detect the welding deviation situations of the poles and the bus assembly in the battery, and is therefore applicable to the battery and a power utilization device using the battery.

The battery refers to a single physical module that includes one or more battery cells to provide higher voltage and capacity. For example, the battery mentioned in the present application may include a battery module or a battery pack, or the like. Moreover, the battery mentioned in in the present application may be a cylindrical battery. The battery typically includes a battery box for packaging one or more battery cells. The battery box can prevent liquids or other foreign objects from affecting the charging or discharging of the battery cells.

The power utilization device may be a vehicle, a mobile phone, a portable device, a notebook computer, a steamship, a spacecraft, an electric toy and an electric tool, and the like. The vehicles may be a fuel vehicle, a gas vehicle or a new energy vehicle, the new energy vehicle may be a pure electric vehicle, a hybrid vehicle or a range extended vehicle, etc.; the spacecraft may be an airplane, a rocket, a space shuttle, or a spacecraft, etc.; the electric toy includes fixed or movable electric toys, such as game consoles, electric car toys, electric ship toys and electric airplane toys, etc.; the electric tool includes metal cutting electric tools, grinding electric tools, assembling electric tools and railway electric tools, such as electric drills, electric grinders, electric wrenches, electric screwdrivers, electric hammers, electric impact drills, concrete vibrators and electric planers, etc. The embodiments of the present application do not impose special restrictions on the above-mentioned power utilization device.

In the following embodiments, for the convenience of description, description is made with an example of taking a vehicle as the power utilization device.

Please refer to FIG. 1, FIG. 1 is a schematic structural diagram of a vehicle 00 according to some embodiments of the present application.

As shown in FIG. 1, the vehicle 00 may be a fuel vehicle, a gas vehicle or a new energy vehicle, and the new energy vehicle may be a pure electric vehicle, a hybrid vehicle, or a range extended vehicle, or the like. The vehicle 00 includes a battery 1, a controller 2 and a motor 3. The battery 1 is configured to supply power to the controller 2 and the motor 3, the power being used as an operating power source and a driving power source of the vehicle 00. For example, the battery 1 is used for the working power demands of starting, navigation and running of the vehicle 00. For example, the battery 1 supplies power to the controller 2, the controller 2 controls the battery 1 to supply power to the motor 3, and the motor 3 receives and uses the power of the battery 1 as the driving power source of the vehicle 00, and the power replaces or partially replaces fuel or natural gas to provide driving power for the vehicle 00.

Figure 2:
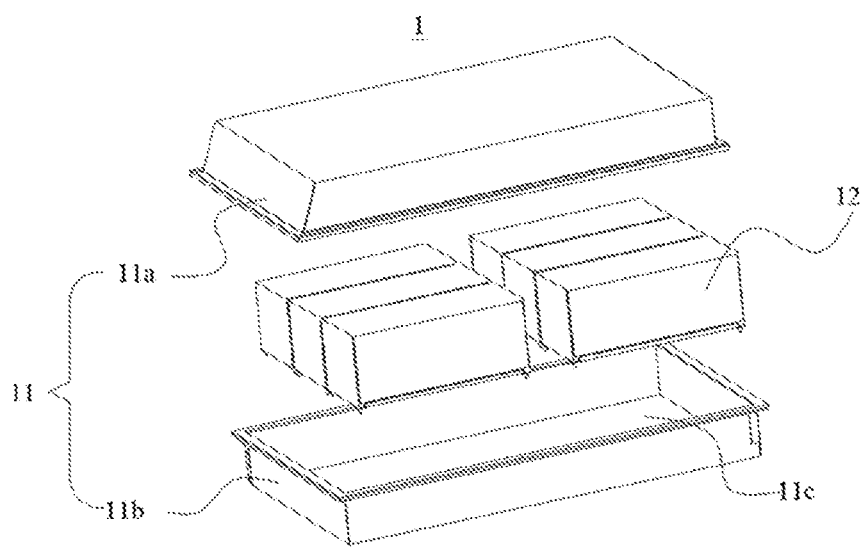
FIG. 2 is a schematic structural diagram of a battery according to the embodiments of the present application.

Please refer to FIG. 2, FIG. 2 is a schematic diagram of explosion of a battery 1 provided by some embodiments of the present application.

As shown in FIG. 2, the battery 1 includes a box 11 and battery cells 12. The box 11 is configured to accommodate the battery cells 12, and the box 11 may be of various structures. In some embodiments, the box 11 may include a first box part 11a and a second box part 11b, the first box part 11a and the second box part 11b cover each other, and the first box part 11a and the second box part 11b define an inner space 11c for accommodating the battery cells 12. The second box part 11b may be of a hollow structure with one open end, the first box part 11a is of a plate-like structure, and the first box part 11a covers the open side of the second box part 11b to form the box 11 with the inner space 11c; and the first box part 11a and the second box part 11b can also be of a hollow structure with one open side respectively, and the open side of the first box part 11a covers the open side of the second box part 11b to form the box 11 with the inner space 11c. Of course, the first box part 11a and the second box part 11b may be in various shapes, such as a cylinder, a cuboid, and the like.

It is assumed that the first box part 11a covers the top of the second box part 11b, the first box part 11a may also be referred to as an upper box cover, and the second box part 11b may also be referred to as a lower box.

In FIG. 2, there are a plurality of battery cells 12. The plurality of battery cells 12 may be connected in series, in parallel, or in parallel and series, and connection in parallel and series means that the plurality of battery cells 12 are both connected in series and in parallel. The plurality of battery cells 12 can be directly connected together in series, in parallel, or in parallel and series, and then a whole formed by the plurality of battery cells 12 is accommodated in the box 11; of course, the plurality of battery cells 12 can also be connected in series, in parallel, or in parallel and series to form battery modules first, then a plurality of battery modules are connected in series, in parallel, or in parallel and series to form a whole, and the whole is accommodated in the box 11. In some embodiments, there are a plurality of battery cells 12, and the plurality of battery cells 12 are connected in series, in parallel, or in parallel and series to form battery modules first. Then, a plurality of battery modules are connected in series, in parallel, or in parallel and series to form a whole, and the whole is accommodated in the box 11.

Figure 3:
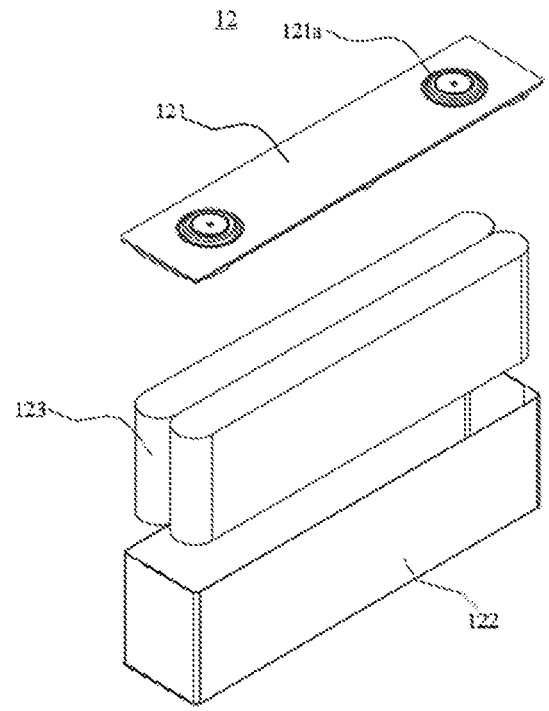
FIG. 3 is a schematic structural diagram of a battery cell according to the embodiments of the present application.

Please refer to FIG. 3, FIG. 3 is a schematic structural diagram of a battery cell 12 provided by some embodiments of the present application.

FIG. 3 is a schematic diagram of a breakdown structure of a battery cell 12 provided by some embodiments of the present application. The battery cell 12 refers to a smallest unit constituting the battery. As shown in FIG. 3, the battery cell 12 includes an end cap 121, a case 122 and an electrode assembly 123.

The end cap 121 refers to a component that covers an opening of the case 122 to isolate an internal environment of the battery cell 12 from an external environment. Unrestrictedly, the shape of the end cap 121 may be adapted to the shape of the case 122 to fit the case 122. Optionally, the end cap 121 may be made of a material with certain hardness and strength (such as aluminum alloy), in such a way, the end cap 121 is uneasily deformed when it is squeezed and collided, so that the battery cell 12 may have a higher structural strength, and the safety performance may also be improved. Functional components such as poles 121a and the like may be provided on the end cap 121. The poles 121a may be configured to be electrically connected to the electrode assembly 123 to output or input electrical energy of the battery cells 12. In some embodiments, a pressure relief mechanism for releasing internal pressure when the internal pressure or temperature of the battery cell 12 reaches a threshold value may also be provided on the end cap 121. The material of the end cap 121 may also be various, for example, copper, iron, aluminum, stainless steel, aluminum alloy, plastic, etc., which is not particularly limited in the embodiments of the present application. In some embodiments, an insulating member may also be provided on the inner side of the end cap 121, and the insulating member may be configured to isolate electrical connection components in the case 122 from the end cap 121 to reduce the risk of short circuits. Illustratively, the insulating member may be plastic, rubber, or the like.

The case 122 is an assembly for mating with the end cap 121 to form an internal environment of the battery cells 12, where the formed internal environment can be used to accommodate the electrode assembly 123, electrolyte (not shown in the figure) and other components. The case 122 and the end cap 121 may be independent components, an opening may be provided on the case 122, and the end cap 121 is allowed to cover the opening at the opening to form the internal environment of the battery cell 12. Unrestrictedly, the end cap 121 and the case 122 can also be integrated, specifically, the end cap 121 and the case 122 can define a common connection surface before other components are put into the case; and when the inside of the case 122 needs to be packaged, the end cap 121 covers the case 122. The case 122 may be of various shapes and sizes, such as be cuboid-shaped, cylindrical, hexagonal, and the like. Specifically, the shape of the case 122 may be determined according to the specific shape and size of the electrode assembly 123. The material of the housing 122 may be various, for example, copper, iron, aluminum, stainless steel, aluminum alloy, plastic, etc., which is not particularly limited in the embodiments of the present application.

The electrode assembly 123 is a component that undergoes an electrochemical reaction in a battery cell 12. One or more electrode assemblies 123 may be contained within the case 122. The electrode assembly 123 is mainly formed by winding or stacking a positive plate and a negative plate, and a separator is usually provided between the positive plate and the negative plate. The parts of the positive plate and the negative plate with active materials constitute a main body part of a cell assembly, and the parts of the positive plate and the negative plate without active materials separately constitute a tab (not shown in the figure). A positive tab and a negative tab can be located at one end of the main body part together or at both ends of the main body part respectively. During the charging and discharging processes of the battery, a positive active material and a negative active material react with the electrolyte, and the tabs are connected to the poles 121a to form a current loop.

In order to facilitate the description of the welding deviation detection device, the battery 1 provided by the embodiments of the present application will be explained in detail below with reference to the accompanying drawings first, and then the welding deviation detection device provided by the present application will be explained in combination with the structure of the battery 1. It should be noted here that the welding deviation situations of the poles 121a and the bus assembly 14 in the battery 1 provided by the embodiments of the present application can be detected by means of the welding deviation detection device and the welding deviation detection method in the following embodiments.

Figure 4:
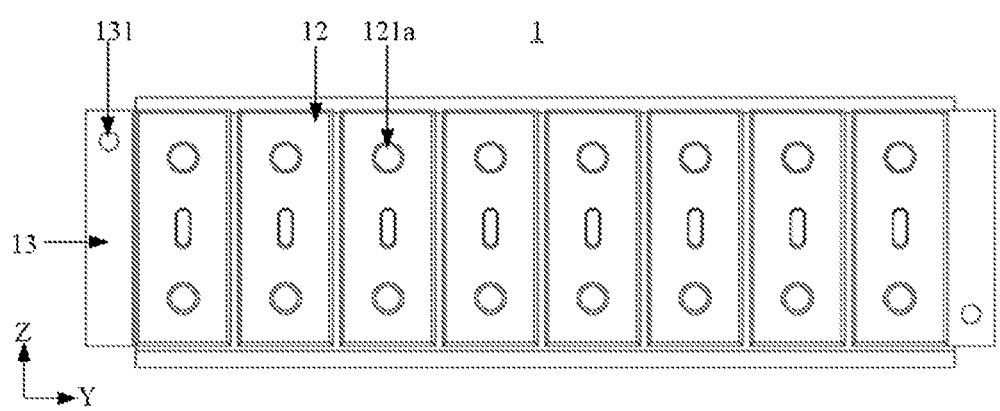
FIG. 4 is a schematic structural diagram of another battery according to the embodiments of the present application, wherein a bus assembly is not shown in FIG. 4.
Figure 5:
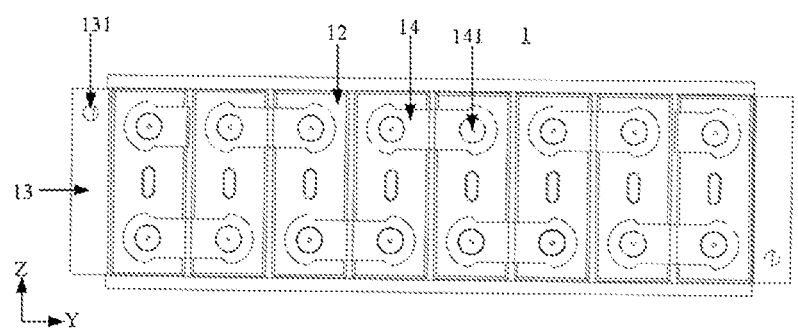
FIG. 5 is a schematic structural diagram of another battery according to the embodiments of the present application, wherein the bus assembly is shown in FIG. 5.

FIG. 4 is a schematic structural diagram of a battery 1 provided by the embodiments of the present application, and FIG. 5 is a structural schematic diagram of another battery 1 provided by the embodiments of the present application, where a bus assembly 14 is not shown in FIG. 4, but shown in FIG. 5. As shown in FIGS. 4 and 5, the battery 1 includes end plates 13 and a bus assembly 14. Location holes 131 are provided on the end plates 13 along a first direction X, and configured to localize poles 121a of a plurality of battery cells 12. The bus assembly 14 is welded to the poles 121a based on the localization of the location holes 131, and configured to electrically connect the plurality of battery cells 12.

The battery 1 provided by the embodiments of the present application includes two end plates 13 located opposite to each other, and the structures of the two end plates 13 may be the same or different. After the plurality of battery cells 12 are stacked along the length direction of the battery 1, the two end plates 13 are located at both ends of the plurality of battery cells 12 along the length direction of the battery 1 to limit the plurality of battery cells 12 along the length direction of the battery 1. After the plurality of battery cells 12 are limited by the two end plates 13, a relative position between the location hole 131 on the end plate 13 and the pole 121a of each battery cell 12 is fixed, so the poles 121a of the plurality of battery cells 12 can be localized by the location holes 131, in other words, the positions of the plurality of poles 121a are determined based on the positions of the location holes 131. Where, the location hole 131 may be a round hole, a square hole, etc.; and the location hole 131 may be a through hole provided on the end plate 13 along the first direction X or a blind hole provided on the end plate 13 along the first direction X. The position of the location hole 131 may be position coordinates of the location hole 131 in a plane coordinate system, the position of the pole 121a may be position coordinates of the pole 121a in the same plane coordinate system, and the plane coordinate system may be a coordinate system established by taking the length direction of the battery 1 as a horizontal axis/vertical axis, taking the width direction of the battery 1 as a vertical axis/horizontal axis, and taking any point in a plane where the end of the battery 1 facing the bus assembly 14 is located as an origin.

At least one of the two end plates 13 may be provided with the location holes 131 along the first direction X, and the poles 121a of the plurality of battery cells 12 may be localized through any location hole 131. As an example, the location holes 131 may be provided on the first end plate 13 only along the first direction X, and then the plurality of poles 121a are localized through the location holes 131 on the first end plate 13; alternatively, the location holes 131 may be provided on the second end plate 13 only along the first direction X, and then the plurality of poles 121a are localized through the location holes 131 on the second end plate 13; alternatively, the location holes 131 may be provided both on the two end plates 13 through the first direction X, and then the plurality of poles 121a are localized through the location holes 131 on the two end plates 13. Where, the first direction X is the height direction of the battery 1, and a label of the first direction X may refer to FIG. 6.

The bus assembly 14 is in a substantially rectangular plate shape. After the plurality of battery cells 12 are stacked, the poles 121a of the plurality of battery cells 12 are not connected to each other. If the bus assembly 14 and the poles 121a are welded together, the poles 121a of the plurality of adjacent battery cells 12 can be communicated, so that the plurality of adjacent battery cells 12 are electrically connected. When the bus assembly 14 and the poles 121a are welded, the bus assembly 14 covers the plurality of poles 121a, so that it is difficult for the welding device 52 to find the positions of the poles 121a. However, since the bus assembly 14 only covers the poles 121a and does not cover the end plates 13, the covered poles 121a can be localized based on the location holes 131 on the end plates 13, thereby facilitating the welding device 52 to accurately weld the bus assembly 14 and the plurality of poles together.

In the embodiments of the present application, the location holes 131 are provided on the end plates 13. Since the relative positions of the end plates 13 and the plurality of battery cells 12 limited are fixed, the relative positions of the location holes 131 on the end plate 13 and the poles 121a in the plurality of battery cells 12 are fixed, so the poles 121a of the plurality of battery cells 12 can be localized through the location holes 131. Even if the bus assembly 14 covers the plurality of poles 121a, the plurality of poles 121a can be accurately localized through the location holes 131, so that a location reference can be provided for welding a busbar and the poles 121a, which facilitates accurate welding of the bus assembly 14 and the poles 121a. The location hole 131 can also provide a position reference for detecting welding deviation situations between the bus assembly 14 and the poles 121a subsequently. In addition, due to the arrangement of the location holes 131, holes are not required to be provided on the poles 121a, so that the surfaces of the poles 121a are complete, and a larger weldable area can be provided.

Generally, the battery 1 flows from a previous station to a next station on a conveyor belt of an assembly line 7. In the process of conveying by the conveyor belt, the battery 1 inevitably rotates on the conveyor belt due to vibration and other reasons. In order to avoid that the location holes 131 are provided on only one end plate 13 and only one location hole 131 is provided, so when the battery 1 rotates before flowing to a welding station, the plurality of poles 121a cannot be accurately localized through one location hole 131, in some embodiments, the number of the location hole 131 may be two, and the two location holes 131 are distributed in a staggered manner along the second direction Y and the third direction Z, and the second direction Y and the third direction Z are perpendicular to the first direction X mutually.

It should be noted here that the second direction Y and the third direction Z may be the length direction and width direction of the battery 1 respectively. For example, the second direction Y is the length direction of the battery 1, and the third direction Z is the width direction of the battery 1.

For any one end plate 13, the number of the location hole 131 provided on the end plate 13 may be two.

When only one end plate 13 is provided with two location holes 131, the two location holes 131 can be distributed in a staggered manner along the second direction Y and the third direction Z. In this case, in a same plane coordinate system established by taking the second direction Y and the third direction Z as coordinate axes, the two location holes 131 are different in x-coordinate and y-coordinate.

When two location holes 131 are provided on both end plates 13 respectively, the two location holes 131 on the first end plate 13 may be distributed in a staggered manner along the second direction Y and the third direction Z, and the two location holes 131 on the second end plate 13 may also be distributed in a staggered manner along the second direction Y and the third direction Z. Further, the four location holes 131 on the two end plates 13 may be distributed in a staggered manner along the second direction Y and the third direction Z. In this case, in a same plane coordinate system established by taking the second direction Y and the third direction Z as coordinate axes, the four location holes 131 are different in x-coordinate and y-coordinate. In this way, the poles 121*a* may be localized from four directions, which improves the location accuracy of the poles 121*a*.

It is understood that, for any end plate 13, the number of the location hole 131 provided on the end plate 13 may be more than three, and the number of the location hole 131 on the end plate 13 is not limited in the embodiments of the present application. However, once there are too many location holes 131 provided on the end plate 13, the structural strength of the end plate 13 may be easily affected, and the workload of position determination of the poles 121*a* based on the positions of the location holes 131 will be increased, therefore, the number of the location hole 131 may be reasonably set according to the strength requirements of the end plate 13 and other actual situations. For example, preferably, the number of the location hole 131 on one end plate 13 may be two.

The number of the location hole 131 is set to be two, and the two location holes 131 are distributed in a staggered manner along the second direction Y and the third direction Z, in this way, the two location holes 131 may localize the poles 121*a* from different directions, which improves the location accuracy of the poles 121*a*.

In some embodiments, as shown in FIG. 5, a detection hole 141 is provided at a portion of the bus assembly 14 corresponding to the pole 121*a*, the detection of a fitting gap between the pole 121*a* and the bus assembly 14 is allowed through the detection hole 141, and an aperture of the detection hole 141 is 1.5 mm-2 mm.

The bus assembly 14 covers the poles 121*a* along the first direction X. After the bus assembly 14 and the poles 121*a* are welded along the first direction X, there may be gaps between the bus assembly 14 and the poles 121*a*, that is, the fitting gaps. If the size of the gap exceeds a certain range, it is considered that the welding quality does not meet the requirements. Therefore, it is necessary to detect the fitting gaps between the poles 121*a* and the bus assembly 14.

The detection hole 141 may be a round hole, a square hole, or the like. The detection holes 141 are arranged at the positions of the bus assembly 14 corresponding to the poles 121*a*. The number of the detection hole 141 is the same as that of the pole 121*a*, and the detection holes 141 are in one-to-one correspondence with the positions of the poles 121*a*. The aperture of the detection hole 141 may be set according to the detection requirements of a detector. For example, the aperture of the detection hole 141 may be 1.5 mm-2 mm. However, it is worth pointing out that the larger the aperture of the detection hole 141 is, the smaller a contact surface between the bus assembly 14 and the pole 121*a* is, the smaller the area of a weld zone during welding is, and the worse the welding quality is. Therefore, the aperture of the detection hole 141 should not be too large. On the premise of ensuring the detection requirements, the aperture of the detection hole 141 may be smaller.

The detection holes 141 are provided at the portions of the bus assembly 14 corresponding to the pole 121*a*, which facilitates the detector to detect the fitting gaps between the poles 121*a* and the bus assembly 14 through the detection hole 141. The aperture of the detection hole 141 is set to be 1.5 mm-2 mm, which not only can meet the detection requirements of the detector, but also will not affect the welding quality due to a too large aperture of the detection hole 141.

A welding deviation detection device provided by the embodiments of the present application will be explained below with reference to the accompanying drawings.

Figure 6:
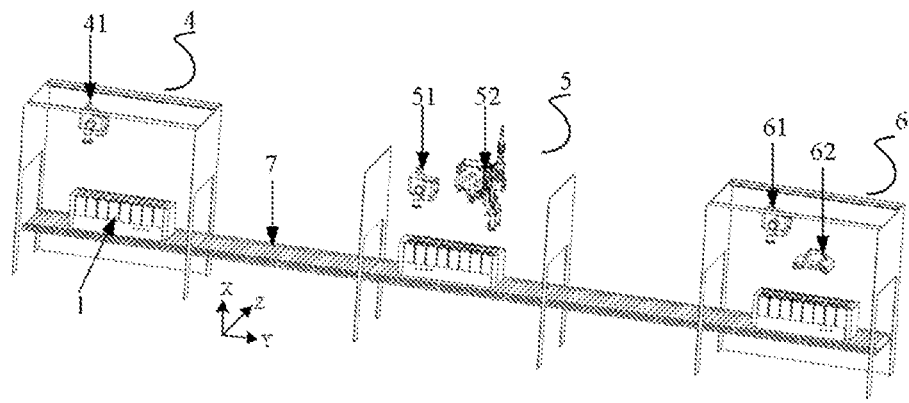
FIG. 6 is a schematic structural diagram of a welding deviation detection device according to the embodiments of the present application.

FIG. 6 is a schematic structural diagram of a welding deviation detection device provided by the embodiments of the present application. As shown in FIG. 6, the welding deviation detection device includes a pre-welding addressing mechanism 4, a welding mechanism 5 and a post-welding detection mechanism 6. The pre-welding addressing mechanism 4 is configured to determine relative position relations between location holes 131 and a plurality of poles 121*a* in a battery 1, and to send the relative position relations to the welding mechanism 5 and the post-welding detection mechanism 6, where the location holes 131 are disposed on end plates 13 of the battery 1 along a first direction. The welding mechanism 5 is configured to detect first positions of the location holes 131, to determine first positions of the plurality of poles 121*a* based on the first positions of the location holes 131 and the received relative position relations, and to weld a bus assembly 14 to the plurality of poles 121*a* based on the first positions of the plurality of poles 121*a* to form a plurality of welds. The post-welding detection mechanism 6 is configured to detect second positions of the location holes 131 and positions of the plurality of welds, and to detect welding deviation situations of the bus assembly 14 and the plurality of poles 121*a* based on the second positions of the location holes 131, the positions of the plurality of welds and the received relative position relations.

The pre-welding addressing mechanism 4 is located upstream of the welding mechanism 5 on an assembly line 7, and the post-welding detection mechanism 6 is located downstream of the welding mechanism 5 on the assembly line 7. The pre-welding addressing mechanism 4, the welding mechanism 5 and the post-welding detection mechanism 6 are equivalent to three stations on the assembly line 7 from upstream to downstream. The poles 121*a* in the pre-welding addressing mechanism 4 are not covered with the bus assembly 14, the poles 121*a* and the end plates 13 are all exposed, so the pre-welding detection mechanism can determine the relative position relations between the location holes 131 and the plurality of poles 121*a*. The poles 121*a* in the welding mechanism 5 and the post-welding detection mechanism 6 are covered with the bus assembly 14, and in the poles 121*a* and the end plates 13, only the end plates 13 are exposed, so the welding mechanism 5 and the post-welding detection mechanism 6 can only detect the positions of the location holes 131 on the end plates 13, and cannot directly detect the position of each pole 121*a*. When the welding mechanism 5 receives the relative position relations sent by the pre-welding addressing mechanism 4, the position of each pole 121*a* in the welding mechanism 5 can be determined according to the detected positions of the location holes 131 and the received relative position relations. When the post-welding detection mechanism 6 receives the relative position relations sent by the pre-welding addressing mechanism 4, the position of each pole 121*a* in the post-welding detection mechanism 6 can be determined according to the detected positions of the location holes 131 and the received relative position relation.

For the convenience of description, the position of the location hole 131 in the welding mechanism 5 is marked as a first position of the location hole 131, and the position of the pole 121*a* in the welding mechanism 5 is marked as a first position of the pole 121*a*; the position of the location hole 131 in the post-welding detection mechanism 6 is marked as a second position of the location hole 131, and the position of the pole 121*a* in the post-welding detection mechanism 6 is marked as a second position of the pole 121*a*.

Based on the description of the above embodiments, it can be seen that location holes 131 may be provided on at least one end plate 13 in the battery 1, and at least one location hole 131 may be provided on one end plate 13. In this embodiment, the pre-welding addressing mechanism 4 can determine the relative position relations between any location hole 131 on each end plate 13 and the plurality of poles 121a. For example, when one location hole 131 is provided on the first end plate 13, two location holes 131 are provided on the second end plate 13, and the number of the pole 121a is six, the pre-welding addressing mechanism 4 may determine the relative position relations between the location hole 131 on the first end plate 13 and the six poles 121a, the relative position relations between the first location hole 131 on the second end plate 13 and the six pole poles 121a, and the relative position relations between the second location hole 131 on the second end plate 13 and the six poles 121a. Then, the pre-welding addressing mechanism 4 may send the determined relative position relations between each location hole 131 and each pole 121a to the welding mechanism 5 and the post-welding detection mechanism 6.

The welding mechanism 5 can detect a first position of each location hole 131 on each end plate 13 in the welding mechanism 5, and determine a first position of each pole 121a based on the first position of each location hole 131 and the received relative position relation so as to accurately weld the bus assembly 14 to each pole 121a based on the determined first position of each pole 121a. Each time the bus assembly 14 is welded to one pole 121a, a weld may be obtained, accordingly, the number of the weld is the same as that of the pole 121a, and the position of the weld corresponds to that of the pole 121a.

Once in the post-welding detection mechanism 6, the bus assembly 14 has been welded to all the poles 121a, the post-welding detection mechanism 6 can detect a second position of each location hole 131 on each end plate 13 in the post-welding mechanism, and determine a second position of each pole 121a based on the second position of each location hole 131 and the received relative position relation. The post-welding detection mechanism 6 may also detect the position of each weld. Then, the post-welding detection mechanism 6 may detect welding deviation situations between the bus assembly 14 and the poles 121a based on the second position of each pole 121a and the position of each weld.

In the embodiments of the present application, the pre-welding addressing mechanism 4 can determine the relative position relations between the location holes 131 and the plurality of poles 121a in the battery 1, and send the relative position relations to the welding mechanism 5 and the post-welding detection mechanism 6. The welding mechanism 5 can detect the first positions of the location holes 131, and determine the first positions of the plurality of poles 121a based on the first positions of the location holes 131 and the received relative position relations, so that the welding mechanism 5 can accurately weld the bus assembly 14 to the plurality of poles based on the first positions of the plurality of poles 121a to form a plurality of welds. The post-welding detection mechanism 6 can detect the second positions of the location holes 131 and the positions of the plurality of welds, and detect the welding deviation situations of the bus assembly 14 and the poles 121a based on the second positions of the location holes 131, the positions of the plurality of welds and the received relative position relations. According to the embodiments of the present application, the bus assembly 14 and the plurality of poles 121a can be welded accurately through the welding mechanism 5, and the welding deviation situations can be detected simply, conveniently and timely through the post-welding detection mechanism 6.

In some embodiments, as shown in FIG. 6, the pre-welding addressing mechanism 4 includes a first visual photographing device 41 configured to detect the positions of the location holes 131 and the positions of the plurality of poles 121a, to determine the relative position relations based on the positions of the location holes 131 and the positions of the plurality of poles 121a, and to send the relative position relations to the welding mechanism 5 and the post-welding detection mechanism 6.

The first visual photographing device 41 may be any device that can perform visual photographing and localization, for example, it may be a CCD (charge coupled device) camera. When an assembled battery pack enters the pre-welding addressing mechanism 4, the first visual photographing device 41 may take pictures of the location holes 131 and the poles 121a on the end plates 13, and detect the position of each location hole 131 on each end plate 13 and the position of each pole 121a. When the number of the location hole 131 is m and the number of the poles 121a is n, the first visual photographing device 41 can detect the positions of the m location holes 131 and the positions of the n poles 121a, and can determine m*n relative position relations based on the positions of the m location holes 131 and the positions of the n poles 121a. Then, the m*n relative position relations may be sent to the welding mechanism 5 and the post-welding detection mechanism 6.

The first visual photographing device 41 can establish a plane coordinate system by taking the second direction Y as a horizontal axis/vertical axis, tacking the third direction Z as a vertical axis/horizontal axis, and taking any point in a plane where the end of the battery 1 facing the bus assembly 14 is located as an origin. Then, in the pre-welding addressing mechanism 4, position coordinates of the location holes 131 in the plane coordinate system and position coordinates of each pole 121a in the plane coordinate system are detected; and a distance between each pole 121a and the location hole 131 in the second direction Y and the third direction Z is calculated. The relative position relations between the location holes 131 and the plurality of poles 121a include the distances between the location holes 131 and the poles 121a in the second direction Y and the third direction Z.

With the localization of two poles 121a by two location holes 131 as an example, it is assumed that a plane coordinate system is established by taking a certain point on the end plate 13 as a coordinate origin, taking the second direction Y as a horizontal axis and taking the third direction Z as a vertical axis. In the established coordinate system, the position coordinates of the first location hole 131 are (X1, Y1), the position coordinates of the second location hole 131 are (X2, Y2), and the position coordinates of the first pole 121a are (M1, N1), the position coordinates of the second pole 121a are (M2, N2).

So, the position relation between the first location hole 131 and the first pole 121a includes: a distance between the first location hole 131 and the first pole 121a in the second direction Y is M1-X1, and a distance between the first location hole 131 and the first pole 121a in the third direction Z is N1-Y1. The position relation between the first location hole 131 and the second pole 121a includes: a distance between the first location hole 131 and the second pole 121a in the second direction Y is M2-X1, and a distance between the first location hole 131 and the second pole 121a in the third direction Z is N2-Y1.

The position relation between the second location hole 131 and the first pole 121a includes: a distance between the second location hole 131 and the first pole 121a in the second direction Y is M1-X2, and a distance between the second location hole 131 and the first pole 121a in the third direction Z is N1-Y2. The position relation between the second location hole 131 and the second pole 121a includes: a distance between the second location hole 131 and the second pole 121a in the second direction Y is M2-X2, and a distance between the second location hole 131 and the first pole 121a in the third direction Z is N2-Y2.

Through the first visual photographing device 41, the positions of the location holes 131 and the positions of the plurality of poles 121a can be detected in the pre-welding addressing mechanism 4, relative position relations can be determined based on the positions of the location holes 131 and the positions of the plurality of poles 121a, and the relative position relations can be sent to the welding mechanism 5 and the post-welding detection mechanism 6, which can facilitate the welding mechanism 5 and the post-welding detection mechanism 6 to accurately determine the position of each pole 121a.

In some embodiments, as shown in FIG. 6, the welding mechanism 5 includes a second visual photographing device 51 and a welding device 52. The second visual photographing device 51 is configured to detect the first positions of the location holes 131 and receive the relative position relations, to determine the first positions of the plurality of poles 121a based on the first positions of the location holes 131 and the relative position relations, and to send the first positions of the plurality of poles 121a to the welding device 52. The welding device 52 is configured to receive the first positions of the plurality of poles 121a, and to weld the bus assembly 14 to the plurality of poles 121a based on the first positions of the plurality of poles 121a.

The structure of the second visual photographing device 51 may be the same as that of the first visual photographing device 41. The second visual photographing device 51 may be electrically connected to the first visual photographing device 41 so as to receive the relative position relations sent by the first visual photographing device 41.

The second visual photographing device 51 can establish a plane coordinate system by taking the second direction Y as a horizontal axis/vertical axis, taking the third direction Z as a vertical axis/horizontal axis, and taking any point in a plane where the end of the battery 1 facing the bus assembly 14 is located as an origin. When the battery pack enters the welding mechanism 5 along with the assembly line 7, the second visual photographing device 51 can take pictures of the location holes 131 on the end plates 13, and detect the position coordinates of each location hole 131 in the plane coordinate system in the welding mechanism 5, that is, the first positions of the location holes 131. Then, based on the first positions of the location holes 131 and the received relative position relations, the position coordinates of each pole 121a in the plane coordinate system, that is, the first positions of the poles 121a, are calculated. The second visual photographing device 51 may also be electrically connected to the welding device 52 so as to send the first position of each pole 121a to the welding device 52. Where, the welding device 52 may be a laser welding vibration lens configured to realize the collimation and focusing of laser, and to realize the welding of the poles 121a and the bus assembly 14.

When the number of the location hole 131 is m and the number of the pole 121a is n, the second visual photographing device 51 can detect the first positions of the m location holes 131, and can determine the first positions of then poles 121a based on the first positions of the m location holes 131 and m*n relative position relations. Then, the first positions of the n poles 121a may be sent to the welding device 52.

Through the second visual photographing device 51, in the welding mechanism 5, the first positions of the location holes 131 can be detected, the relative position relations sent by the first visual photographing device 41 can be received, the first positions of the plurality of poles 121a can be determined based on the first positions of the location holes 131 and the relative position relations, and the first positions of the plurality of poles 121a are sent to the welding device 52. Correspondingly, the welding device 52 can receive the first positions of the plurality of poles 121a, and weld the bus assembly 14 to the plurality of poles 121a based on the first positions of the plurality of poles 121a, and the bus assembly 14 and the plurality of poles 121a can be accurately welded through the welding device 52.

In some embodiments, as shown in FIG. 6, the post-welding detection mechanism 6 includes a third visual photographing device 61 configured to detect the second positions of the location holes 131 and the positions of the plurality of welds, to receive the relative position relations, to determine the second positions of the plurality of poles 121a based on the second positions of the location holes 131 and the relative position relations, and to detect welding deviation situations of the bus assembly 14 and the poles 121a based on the second positions of the plurality of poles 121a and the positions of the plurality of welds, The structure of the third visual photographing device 61 may be the same as the structure of the first visual photographing device 41 and the structure of the second visual photographing device 51. The third visual photographing device 61 may be electrically connected to the first visual photographing device 41 so as to receive the relative position relations sent by the first visual photographing device 41.

The third visual photographing device 61 can establish a plane coordinate system by taking the second direction Y as a horizontal axis/vertical axis, taking the third direction Z as a vertical axis/horizontal axis, and taking any point in a plane where the end of the battery 1 facing the bus assembly 14 is located as an origin. After the poles 121a are welded to the bus assembly 14 in the welding mechanism 5, a battery pack enters the post-welding detection mechanism 6 along with the assembly line 7. In the post-welding detection mechanism 6, the third visual photographing device 61 can take pictures of the location holes 131 on the end plates 13, and detect the position coordinates of each location hole 131 in the plane coordinate system in the post-welding detection mechanism 6, that is, the second position of the location hole 131. Then, based on the second positions of the location holes 131 and the received relative position relations, the position coordinates of each pole 121a in the plane coordinate system, that is, the second position of the pole 121a, are calculated. The third visual photographing device 61 can also detect the position of each weld in the post-welding detection mechanism 6, and then compare the second position of each pole 121a with the position of the corresponding weld to detect the welding deviation situations of the bus assembly 14 and the poles 121a. Where, when the weld is circular, the position of a certain weld may be the position coordinates of a circle center of the weld.

As an example, when the number of the location hole 131 is m and the number of the pole 121a is n, the third visual photographing device 61 can detect the second positions of the m location holes 131, and can determine the second positions of the n poles 121a based on the second positions of the m location holes 131 and m*n relative position relations. The third visual photographing device 61 can also detect the positions of n welds in the post-welding detection mechanism 6, and then detect the welding deviation situations of the bus assembly 14 and the n poles 121a based on the second positions of the n poles 121a and the positions of the n welds.

A first distance threshold of the positions of the poles 121a and the positions of the welds in the second direction Y and a second distance threshold of the positions of the poles 121a and the positions of the welds in the third direction Z may be pre-stored in the photographing device 61. When the third visual photographing device 61 compares the second position of each pole 121a with the position of the corresponding weld to detect the welding deviation situation of the bus assembly 14 and the pole 121a, with a certain pole 121a and its corresponding weld as an example, a first distance between the second position of the pole 121a and the position of the corresponding weld in the second direction Y can be determined, and a second distance between the second position of the pole 121a and the position of the corresponding weld in the third direction Z can be determined. If the first distance exceeds the first distance threshold, and/or, the second distance exceeds the second distance threshold, it is determined that the pole 121a deviates from the corresponding weld, so that it can be determined that there is a welding deviation between the bus assembly 14 and the pole 121a. On the contrary, it can be determined that there is no welding deviation between the bus assembly 14 and the pole 121a.

Through the third visual photographing device 61, in the post-welding detection mechanism 6, the second positions of the location holes 131 and the positions of the plurality of welds can be detected, the relative position relations sent by the first visual photographing device 41 can be received, the second positions of the plurality of poles 121a can be determined based on the second positions of the location holes 131 and the relative position relations, and the welding deviation situations of the bus assembly 14 and the poles 121a can be detected based on the second positions of the plurality of poles 121a and the positions of the welds, so as to achieve good welding quality monitoring.

In some embodiments, as shown in FIG. 6, the post-welding detection mechanism 6 may further include an electronic measuring instrument 62 configured to detect fitting gaps between the poles 121a and the bus assembly 14 through the detection holes 141.

The electronic measuring instrument 62 may be a three-dimensional profiler or the like. With the three-dimensional profiler as an example, the three-dimensional profiler has a signal transmitting end and a signal receiving end, a certain included angle exists between the signal transmitting end and the signal receiving end, and the signal transmitting end of the three-dimensional profiler can send a signal to the signal receiving end through the detection hole 141, and then determine the fitting gaps between the poles 121a and the bus assembly 14 through feedback from the signal receiving end. Where, the fitting gap refers to a distance between the pole 121a and the bus assembly 14 in the first direction X. A fitting gap exists between each of the poles 121a and the bus assembly 14 in the first direction X, so the number of the fitting gap is the same as that of the pole 121a.

As an example, when the number of the pole 121a is n, there are n fitting gaps between the n poles 121a and the bus assembly 14. The electronic measuring instrument 62 can respectively detect the n fitting gaps between the n poles 121a and the bus assembly 14 through the n detection holes 141 on the bus assembly 14. Then, the n fitting gaps can be evaluated, and the welding quality of the n poles 121a and the bus assembly 14 can be evaluated.

A gap threshold between the pole 121a and the bus assembly 14 may be pre-stored in the electronic measuring instrument 62. When the electronic measuring instrument 62 detects the n fitting gaps between the n poles 121a and the bus assembly 14 through the n detection holes 141 on the bus assembly 14, with a certain pole 121a and the bus assembly 14 as an example, the fitting gap between the pole 121a and the bus assembly 14 can be compared with the gap threshold. If the fitting gap between the pole 121a and the bus assembly 14 is greater than the gap threshold, it is considered that the fitting gap between the pole 121a and the bus assembly 14 is larger, so it can be determined that the welding quality of the pole 121a and the bus assembly 14 is not good. On the contrary, it can be determined that the welding quality of the pole 121a and the bus assembly 14 is good.

The electronic measuring instrument 62 can detect the fitting gap between each pole 121a and the bus assembly 14 through the detection hole 141 in the post-welding detection mechanism 6, and then the welding quality of each pole 121a and the bus assembly 14 can be evaluated based on the fitting gap so as to achieve good welding quality monitoring.

Figure 7:
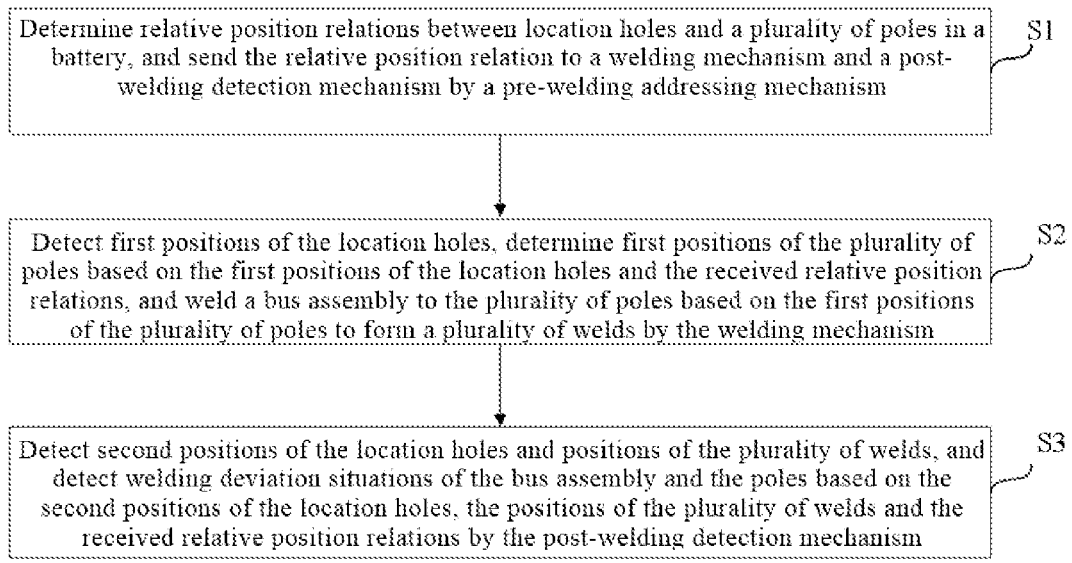
FIG. 7 is a schematic flowchart of a welding deviation detection method according to the embodiments of the present application.

The embodiments of the present application also provide a welding deviation detection method, which can be applied to the welding deviation detection device in the foregoing embodiments. As shown in FIG. 7, the method includes:

S1: relative position relations between location holes 131 and a plurality of poles 121a in a battery 1 are determined, and the relative position relations are sent to a welding mechanism 5 and a post-welding detection mechanism 6 by a pre-welding addressing mechanism 4.

S2: first positions of the location holes 131 are detected, first positions of the plurality of poles 121a are determined based on the first positions of the location holes 131 and the received relative position relations, and a bus assembly 14 is welded to the plurality of poles 121a based on the first positions of the plurality of poles 121a to form a plurality of welds by the welding mechanism 5.

S3: second positions of the location holes 131 and positions of the plurality of welds are detected, and the welding deviation situations of the bus assembly 14 and the poles 121a are detected based on the second positions of the location holes 131, the positions of the plurality of welds and the received relative position relations by the post-welding detection mechanism 6.

In the embodiments of the present application, the relative position relations between the location holes 131 and the plurality of poles 121a in the battery 1 can be determined, and the relative position relations can be sent to the welding mechanism 5 and the post-welding detection mechanism 6 by the pre-welding addressing mechanism 4. The first positions of the location holes 131 can be detected, and the first positions of the plurality of poles 121a can be determined based on the first positions of the location holes 131 and the received relative position relations by the welding mechanism 5, so that the welding mechanism 5 can accurately weld the bus assembly 14 to the plurality of poles based on the first positions of the plurality of poles 121a to form a plurality of welds. The second positions of the location holes 131 and the positions of the plurality of welds can be detected, and the welding deviation situations of the bus assembly 14 and the poles 121a can be detected based on the second positions of the location holes 131, the positions of the plurality of welds and the received relative position relations by the post-welding detection mechanism 6. According to the embodiments of the present application, the bus assembly 14 and the plurality of poles 121*a* can be accurately welded through the welding mechanism 5, and the welding deviation situations can be detected simply, conveniently and timely through the post-welding detection mechanism 6.

In some embodiments, when the pre-welding addressing mechanism 4 includes a first visual photographing device 41, the welding deviation detection method further includes: the positions of the location holes 131 and the positions of the plurality of poles 121*a* are detected, the relative position relations are determined based on the positions of the location holes 131 and the positions of the plurality of poles 121*a*, and the relative position relations are sent to the welding mechanism 5 and the post-welding detection mechanism 6 by the first visual photographing device 41.

In some embodiments, when the welding mechanism 5 includes a second visual photographing device 51 and a welding device 52, the welding deviation detection method further includes: the first positions of the location holes 131 are detected, the relative position relations are received, the first positions of the plurality of poles 121*a* are determined based on the first positions of the location holes 131 and the relative position relations, and the first positions of the plurality of poles 121*a* are sent to the welding device 52 by the second visual photographing device 51; and the first positions of the plurality of poles 121*a* are received, and the bus assembly 14 is welded to the plurality of poles 121*a* based on the first positions of the plurality of poles 121*a* by the welding device 52.

In some embodiments, when the welding mechanism 5 includes a third visual photographing device 61, the welding deviation detection method further includes: the second positions of the location holes 131 and the positions of the plurality of welds are detected, the relative position relations are received, second positions of the plurality of poles 121*a* are determined based on the second positions of the location holes 131 and the relative position relations, and welding deviation situations of the bus assembly 14 and the poles 121*a* are detected based on the second positions of the plurality of poles 121*a* and the positions of the plurality of welds by the third visual photographing device 61.

In some embodiments, when the welding mechanism 5 includes an electronic measuring instrument 62, the welding deviation detection method further includes: fitting gaps between the poles 121*a* and the bus assembly 14 are detected through detection holes 141 by the electronic measuring instrument 62.

The above-mentioned welding deviation detection method corresponds to the welding deviation detection device in the foregoing embodiments. The details of each step in the welding deviation detection method have been described in detail in the embodiments of the corresponding welding deviation detection device, so for explanation of each step in the welding deviation detection method, reference may be made to the relevant description in the embodiments of the welding deviation detection device, which will not be repeated here.

According to some embodiments of the present application, the embodiments of the present application further provide a power utilization device including the battery 1 that is provided in the foregoing embodiments and configured to provide electrical energy for the power utilization device.

The power utilization device may be any of the aforementioned apparatuses or systems using the battery 1. In addition, the power utilization device can detect welding deviation situations between poles 121*a* and a bus assembly 14 in the battery 1 by using the welding deviation detection device and the welding deviation detection method in the foregoing embodiments.

According to some embodiments of the present application, referring to FIG. 6, the present application provides a welding deviation detection device including a pre-welding addressing mechanism 4, a welding mechanism 5 and a post-welding detection mechanism 6. The pre-welding addressing mechanism 4 includes a first visual photographing device 41, the welding mechanism 5 includes a second visual photographing device 51 and a welding device 52, and the post-welding detection mechanism 6 includes a third visual photographing device 61 and an electronic measuring instrument 62. Both the second visual photographing device 51 and the third visual photographing device 61 are electrically connected to the first visual photographing device 41, and the second visual photographing device 51 is electrically connected to the welding device 52.

The first visual photographing device 41 may detect the positions of the location holes 131 and the positions of the plurality of poles 121*a*, determine the relative position relations based on the positions of the location holes 131 and the positions of the plurality of poles 121*a*, and send the relative position relations to the welding mechanism 5 and the post-welding detection mechanism 6.

The second visual photographing device 51 may detect the first positions of the location holes 131, receive the relative position relations, determine the first positions of the plurality of poles 121*a* based on the first position of the location hole 131 and the relative position relations, and send the first positions of the plurality of poles 121*a* to the welding device 52. The welding device 52 may receive the first positions of the plurality of poles 121*a*, and weld the bus assembly 14 to the plurality of poles 121*a* based on the first positions of the plurality of poles 121*a*.

The third visual photographing device 61 may detect the second positions of the location holes 131 and the positions of the plurality of welds, receive the relative position relations, determine the second positions of the plurality of poles 121*a* based on the second positions of the location holes 131 and the relative position relations, and detect the welding deviation situations of the bus assembly 14 and the poles 121*a* based on the second positions of the plurality of poles 121*a* and the positions of the plurality of welds. The electronic measuring instrument 62 may detect fitting gaps between the poles 121*a* and the bus assembly 14 through the detection holes 141.

It will be understood by those skilled in the art that although some of the embodiments herein include certain features rather than other features included in other embodiments, combinations of features of different embodiments are intended to be within the scope of the present application and form different embodiments. For example, in the Claims, any of claimed embodiments may be used in any combination mode.

As mentioned above, the above-mentioned embodiments are merely intended for describing the technical solutions of the present application rather than limiting the present application. Although the present application has been described in detail with reference to the foregoing embodiments, those of ordinary skill in the art should understand that: amendments to the technical solutions recorded in the foregoing embodiments or equivalent substitutions to some of technical features of the technical solutions may still be made. These amendments or substitutions do not enable the essence of corresponding technical solutions to depart from the spirit and scope of the technical solutions of the embodiments of the present disclosure.

What is claimed is:

1. A welding deviation detection device, comprising:
a pre-welding addressing mechanism, configured to determine relative position relations between location holes and a plurality of poles in a battery, and to send the relative position relations to a welding mechanism and a post-welding detection mechanism, wherein the location holes are disposed on end plates of the battery along a first direction;
the welding mechanism, configured to detect first positions of the location holes, to determine first positions of the plurality of poles based on the first positions of the location holes and the received relative position relations, and to weld a bus assembly to the plurality of poles based on the first positions of the plurality of poles to form a plurality of welds; and
the post-welding detection mechanism, configured to detect second positions of the location holes and positions of the plurality of welds, and to detect welding deviation situations of the bus assembly and the poles based on the second positions of the location holes, the positions of the plurality of welds and the received relative position relations.

2. The welding deviation detection device according to claim 1, wherein the pre-welding addressing mechanism comprises a first visual photographing device, configured to detect the positions of the location holes and the positions of the plurality of poles, to determine the relative position relations based on the positions of the location holes and the positions of the plurality of poles, and to send the relative position relations to the welding mechanism and the post-welding detection mechanism.

3. The welding deviation detection device according to claim 1, wherein the welding mechanism comprises:
a second visual photographing device, configured to detect the first positions of the location holes and receive the relative position relations, to determine the first positions of the plurality of poles based on the first positions of the location holes and the relative position relations, and to send the first positions of the plurality of poles to a welding device;
the welding device, configured to receive the first positions of the plurality of poles, and to weld the bus assembly to the plurality of poles based on the first positions of the plurality of poles.

4. The welding deviation detection device according to claim 1, wherein the post-welding detection mechanism comprises a third visual photographing device configured to detect the second positions of the location holes and the positions of the plurality of welds, to receive the relative position relations, to determine second positions of the plurality of poles based on the second positions of the location holes and the relative position relations, and to detect welding deviation situations of the bus assembly and the poles based on the second positions of the plurality of poles and the positions of the plurality of welds.

5. The welding deviation detection device according to claim 1, wherein the post-welding detection mechanism further comprises an electronic measuring instrument configured to detect fitting gaps between the poles and the bus assembly.

6. A welding deviation detection method applied to the welding deviation detection device according to claim 1, comprising:
determining relative position relations between location holes and a plurality of poles in a battery, and sending the relative position relations to a welding mechanism and a post-welding detection mechanism by a pre-welding addressing mechanism;
detecting first positions of the location holes, determining first positions of the plurality of poles based on the first positions of the location holes and the received relative position relations, and welding a bus assembly to the plurality of poles based on the first positions of the plurality of poles to form a plurality of welds by the welding mechanism; and
detecting second positions of the location holes and positions of the plurality of welds, and detecting welding deviation situations of the bus assembly and the poles based on the second positions of the location holes, the positions of the plurality of welds and the received relative position relations by the post-welding detection mechanism.

7. The welding deviation detection method according to claim 6, the welding deviation detection method comprising:
detecting the positions of the location holes and the positions of the plurality of poles, determining the relative position relations based on the positions of the location holes and the positions of the plurality of poles, and sending the relative position relations to the welding mechanism and the post-welding detection mechanism by a first visual photographing device.

8. The welding deviation detection method according to claim 6, the welding deviation detection method comprising:
detecting the first positions of the location holes and receiving the relative position relations, determining the first positions of the plurality of poles based on the first positions of the location holes and the relative position relations, and sending the first positions of the plurality of poles to a welding device by a second visual photographing device; and
receiving the first positions of the plurality of poles, and welding the bus assembly to the plurality of poles based on the first positions of the plurality of poles by the welding device.

9. The welding deviation detection method according to claim 6, the welding deviation detection method comprising:
detecting the second positions of the location holes and the positions of the plurality of welds, receiving the relative position relations, determining second positions of the plurality of poles based on the second positions of the location holes and the relative position relations, and detecting welding deviation situations of the bus assembly and the poles based on the second positions of the plurality of poles and the positions of the plurality of welds by a third visual photographing device.

10. The welding deviation detection method according to claim 6, the welding deviation detection method comprising:
detecting fitting gaps between the poles and the bus assembly by an electronic measuring instrument.

* * * * *